(12) United States Patent
Fields et al.

(10) Patent No.: US 11,214,504 B2
(45) Date of Patent: * Jan. 4, 2022

(54) BIO-DAF SYSTEM FOR DOMESTIC AND INDUSTRIAL WASTEWATER TREATMENT

(71) Applicant: Besser Tech Holdings LLC, Fairfield, NJ (US)

(72) Inventors: William Michael Fields, Highlands Ranch, CO (US); Yuanchun Xu, Highlands Ranch, CO (US); Guichun Zhang, Highlands Ranch, CO (US)

(73) Assignee: Besser Tech Holdings LLC, Fairfield, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/641,686

(22) PCT Filed: Aug. 31, 2018

(86) PCT No.: PCT/US2018/049070
§ 371 (c)(1),
(2) Date: Feb. 25, 2020

(87) PCT Pub. No.: WO2019/046705
PCT Pub. Date: Mar. 7, 2019

(65) Prior Publication Data
US 2020/0223729 A1 Jul. 16, 2020

Related U.S. Application Data

(60) Provisional application No. 62/552,537, filed on Aug. 31, 2017.

(51) Int. Cl.
*C02F 9/00* (2006.01)
*B01D 21/00* (2006.01)
(Continued)

(52) U.S. Cl.
CPC ............ *C02F 9/00* (2013.01); *B01D 21/0084* (2013.01); *B01D 21/06* (2013.01);
(Continued)

(58) Field of Classification Search
CPC ...... C02F 1/24; C02F 9/00; C02F 1/40; C02F 3/121; B03D 1/1431; B03D 1/02;
(Continued)

(56) References Cited

U.S. PATENT DOCUMENTS 1,323,373 A    12/1919   Meyers
2,679,477 A *    5/1954   Kivari ...................... C02F 1/24
                                                              210/608

(Continued)

FOREIGN PATENT DOCUMENTS

CA        2084647 A1    12/1991
WO     WO9304784      3/1993

OTHER PUBLICATIONS

PCT Search Report dated Nov. 28, 2018 for PCT application No. PCT/US2018/042147, 14 pages.

*Primary Examiner* — Claire A Norris
(74) *Attorney, Agent, or Firm* — Wei Wei Jeang; Grable Martin Fulton PLLC (57) ABSTRACT

A system for effectively removing biochemical oxygen demand (BOD), total suspended solids (TSS), ammonia, total nitrogen (TN), and total phosphorus (TP) from wastewater has integrated multiple physiochemical and biological treatment processes into one unit. This system includes a primary DAF unit, anoxic bio-media treatment zone, and a secondary DAF unit. The bio-media treatment zones may be used to remove BOD and TN and may be divided into a number of functional zones. Each functional zone can (Continued)

develop and accumulate optimized bacteria species and microorganisms based on incoming wastewater BOD and nutrient levels.

19 Claims, 5 Drawing Sheets

(51) Int. Cl.
*B01D 21/06* (2006.01)
*B01D 21/24* (2006.01)
*C02F 1/24* (2006.01)
*C02F 1/40* (2006.01)
*C02F 3/30* (2006.01)

(52) U.S. Cl.
CPC ............ B01D 21/2438 (2013.01); *C02F 1/24* (2013.01); *C02F 1/40* (2013.01); *C02F 3/30* (2013.01)

(58) Field of Classification Search
CPC ................ B01D 17/0205; B01D 21/06; B01D 21/2438; B01D 21/0027; B01D 21/14; B01D 21/20; B01D 21/24
USPC .......................................................... 210/521
See application file for complete search history.

(56) References Cited

U.S. PATENT DOCUMENTS

| | | |
|---|---|---|
| 5,028,315 A | 7/1991 | Cruea et al. |
| 5,306,422 A * | 4/1994 | Krofta ................. B03D 1/1462 |
| | | 210/151 |
| 5,354,471 A * | 10/1994 | Timpany ............... C02F 3/1263 |
| | | 210/607 |
| 5,509,535 A | 4/1996 | Schneider |
| 2015/0053600 A1 | 2/2015 | Kirk et al. |

* cited by examiner

BIO-DAF SYSTEM FOR DOMESTIC AND INDUSTRIAL WASTEWATER TREATMENT

CROSS-REFERENCE TO RELATED APPLICATION(S)

This application is a U.S. national stage application under 35 USC § 371 of International Application No. PCT/US18/49070 filed on Aug. 31, 2018 and entitled "BIO-DAF SYSTEM FOR DOMESTIC AND INDUSTRIAL WASTEWATER TREATMENT" which claims priority to U.S. Provisional Application No. 62/552,537 filed on Aug. 31, 2017 and entitled "BIO-DAF SYSTEM FOR DOMESTIC AND INDUSTRIAL WASTEWATER TREATMENT," the entire contents of which are incorporated herein by reference.

BACKGROUND

More and more people have been moving to homes in suburban areas to enjoy the benefits of reasonable house prices, single family homes equipped with modern facilities, larger lots, more open space, better schools and community services, safer neighborhoods, pleasant shopping centers, and a better quality of life. However, many new developments cannot be connected to sewer service via the existing publicly-owned treatment works (POTWs). Small-scale integrated wastewater treatment facilities having a flow capacity ranging from several hundred thousand gallons per day (GPD) to one or two million gallons per day (MGD) are often employed to treat domestic wastewater in these smaller communities and to facilitate reuse of treated water at the point of generation for landscaping and other applicable non-potable reclamation purposes.

Today, more than 73% of POTWs in the USA have a daily treatment flow capacity less than 1 MGD. Most existing POTWs for small communities (less than 1-2 MGD) were constructed in the 1970s and 1980s under federal construction grant funds from the US Environmental Protection Agency (EPA). The overall service life of a treatment plant is about 30 to 40 years. In addition, the EPA has enacted more stringent wastewater discharge regulations in recent years. Therefore, many of the current treatment plants are failing and in need of upgrades and retrofits to meet more stringent, current discharge limits, especially for nutrient removals, such as total nitrogen and total phosphorus.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure includes techniques and implementations for a bio-dissolved air flotation (bio-DAF) system to resolve organic matter, suspended solids, and nutrient removal issues from domestic and municipal wastewater. In some cases, the bio-DAF system may also be used for processing industrial wastewater. The bio-DAF system may include a primary DAF unit, anoxic bio-media bioreactor, multiple-stage aerobic bio-media reactors, and a secondary DAF unit. The bio-DAF system may also include ancillary equipment, such as a gaseous material dissolving system (e.g., an air and/or ozone dissolving system) and blowers.

In municipal and domestic wastewater treatment applications for small communities, the bio-DAF system may effectively remove biochemical oxygen demand (BOD), total suspended solids (TSS), ammonia, total nitrogen (TN), and total phosphorus (TP). The bio-DAF system, discussed herein, meets and exceeds the stringent EPA discharge limits. In industrial wastewater pretreatment applications, the present implementation can significantly remove BOD and TSS to eliminate prohibitive BOD and TSS surcharges for industrial users. For example, in some jurisdictions, the downstream city wastewater treatment plants (WWTP) may implement surcharges, when the high-strength industrial wastewater discharges have BOD and TSS amounts that exceed average domestic wastewater levels, thus, increasing the operating costs of the industrial facility. In this example, by utilizing the bio-DAF system to process the wastewater prior to discharging into the WWTP system, the surcharges may be avoided.

In some implementations, the bio-DAF system, discussed herein, may be an integrated, compact, and modular system configured to provide a physiochemical treatment process together with a biological treatment processes providing the end user with one unit to accomplish all BOD, TSS, and nutrient removal tasks, that conventionally were provided by different systems. In some cases, the bio-DAF system may include a circular zoned dissolved air and/or ozone flotation (CZDAOF) made up of independent zones in a concentric arrangement about a central column.

Figure 1:
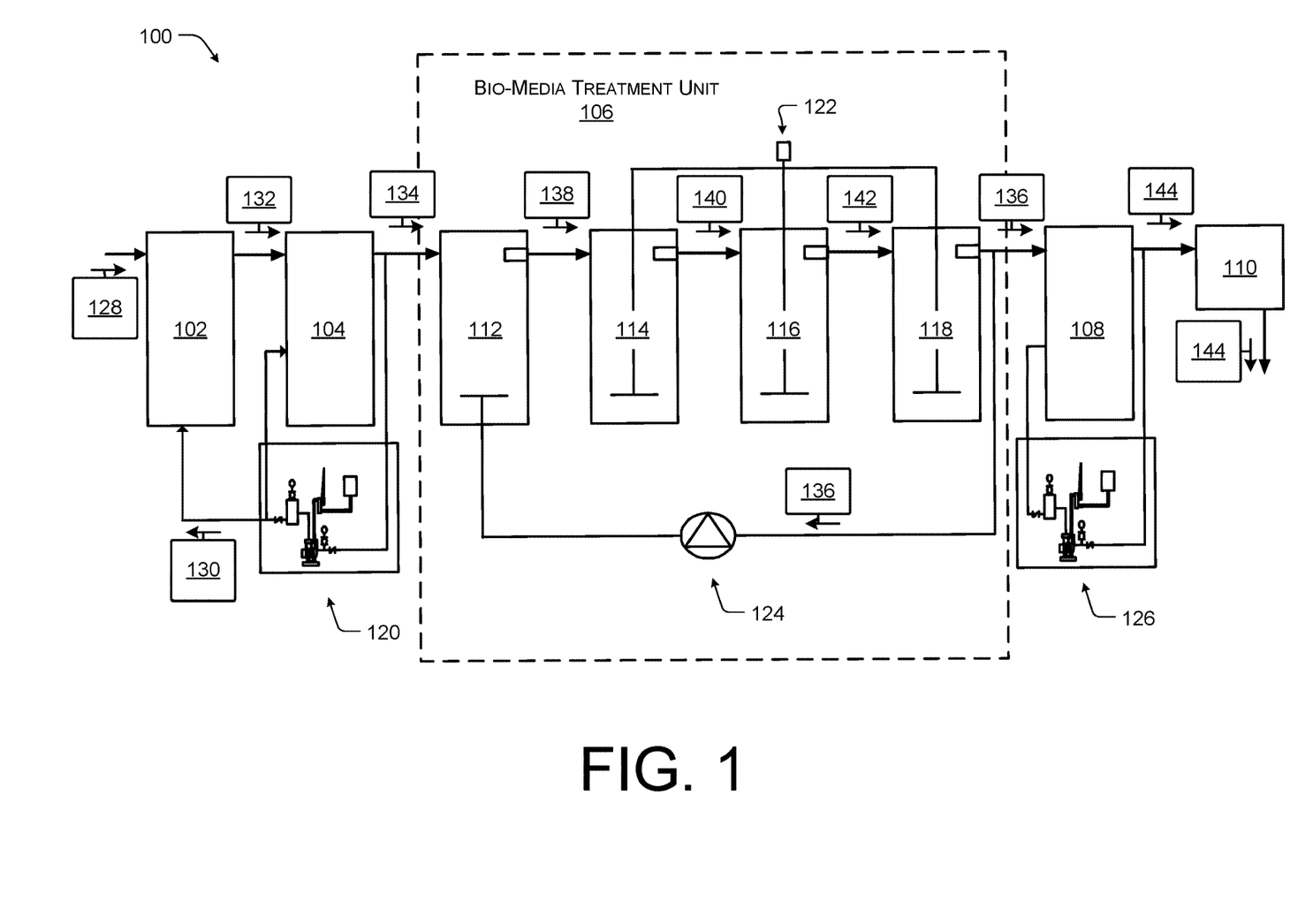
FIG. 1 illustrates a block diagram view of an example bio-dissolved air flotation system for processing wastewater according to some implementations.

FIG. 1 illustrates a block diagram view of an example bio-DAF system 100 for processing wastewater according to some implementations. The bio-DAF system 100 includes a central column 102, a primary DAF unit 104, a bio-media treatment unit 106, a secondary DAF unit 108, and an effluent weir tank 110. The bio-media treatment unit 106 may be divided into multiple independent zones, such as an anoxic bio-media reactor zone 112, a first stage aerobic bio-media reactor zone 114, a second stage aerobic bio-media reactor zone 116, and a third stage aerobic bio-media reactor zone 118. The bio-DAF system 100 may also include a primary gaseous material dissolving system 120, a blower system 122, an internal recycle pump 124, and a secondary gaseous material dissolving system 126.

In some implementations, the central column 102 may be used to introduce and distribute raw wastewater 128 into the bio-DAF system 100 and to provide initial contact between particulate BOD, fats, oils, and grease (FOG), and TSS and pressured recirculated effluent 130. The central column 102 provides removal of FOG and light particulates based on the lower uprising velocities of particulates and FOG. For example, the central column 102 may receive raw wastewater 128 through an inlet pipe. Contemporaneously, a mixture of effluent containing dissolved gases (such as air and/or ozone) 130 recycled from the primary DAF unit 104 is introduced into the central column 102.

Upon exposure to the atmosphere, the dissolved gases in the recirculated effluent 130 generate numerous micro-seized bubbles or microbubbles as pressure is relieved. These microbubbles attach to the surface of organic particulates, FOG, and suspended solid particles within the wastewater 128 and cause the organic particulates, FOG, and suspended solid particles to float upward towards the surface where the organic particulates, FOG, and suspended solid particles may be collected and removed from the wastewater 128. The central column 102 may also be configured to trap large solids or heavies to the large solids and heavies from damaging screen cages and the subsequent bio-media reactors and prevent associated screen cages from plugging or fouling. For example, the large solids or heavies may collect on a bottom surface of the central column 102 where the large solids or heavies may be removed and/or collected by a sludge discharge assembly.

The primary DAF unit 104 may be in fluid communication with the central column 102, such that effluent 132 exiting the central column 102 enters the primary DAF unit 104. In general, the primary DAF unit 104 may be an annular flotation zone that is used to remove suspended solids, FOG, and BOD particulates in the effluent 132 (such as the suspended solids, FOG, and BOD particulates floated by the attached microbubbles). For example, when the effluent 132 (e.g., the mixture of raw wastewater 128 and recycled primary DAF unit effluent 134) is exposed to the atmosphere at the entrance of the primary DAF unit 104, the suspended solids, FOG, and BOD particulates tend to buoy up to the surface due to lower densities. As dissolved gases (such as air and/or ozone) added in the central column 102 and/or the primary DAF unit 104 come out of solution to form micro-sized bubbles, the microbubbles help to accelerate the flotation of FOG and solid particles by attaching to FOG and solid particles to further lower the densities.

The primary gaseous material dissolving system 120 is used to provide the dissolved gases (such as air and/or ozone) for the primary DAF unit 108 and/or the central column 102. The primary gaseous material dissolving system 120 may include at least one microbubble generator and, in some implementations, an ozone generator with associated valves and controls. In some cases, a suction line of the microbubble generators is in fluid communication with an effluent pipe of the primary DAF unit 104 to recirculate primary DAF unit effluent 134. The gaseous material (e.g., air and/or ozone) may be injected on the suction line of the microbubble generators and dissolved under high pressure. Once dissolved gases are exposed to the atmospheric pressure in the flotation zone of the primary DAF unit 108, numerous microbubbles are created. In some cases, the primary gaseous material dissolving system 120 may be an air and ozone dissolving system used to dissolve air and/or ozone.

The primary DAF unit 104 may be in fluid communication with the bio-media treatment unit 106. For instance, an effluent pipe coupled to the primary DAF unit 104 and the anoxic bio-media reactor zone 112 of the bio-media treatment unit 106 allows for transfer of the primary DAF unit effluent 124 into the bio-media treatment unit 112. The bio-media treatment unit 112 is used to biodegrade and remove organic matter and nutrients.

In some implementations, the bio-media treatment unit 106 is divided into four relatively independent functional zones: the anoxic bio-media reactor zone 112, and three aerobic bio-media reactors zone (to provide a three-stage aerobic bio-media treatment) 114, 116, and 118, as discussed in greater detail below. In general, the bio-media treatment process is based on attached growth biofilm principles to eliminate activated sludge. In some cases, floating plastic media are kept inside the various reactors 112-118 to provide a place for bacteria and microorganism growth. Aeration is supplied to the aerobic reactors 114-118 to provide the necessary oxygen for the microbial growth and sufficient mixing to fully disperse the plastic media throughout the reactors 114-118. The mixing also serves as a measure to control the biofilm thickness on the plastic media. When the biomass becomes too thick and heavy to hold onto the plastic media, it is sloughed or stripped off from the plastic media. For example, the bio-DAF system 100 may implement an aeration and turbulence introduction process. The aeration and turbulence within the bio-media treatment unit 106 keeps the biofilm thin and fresh, because extra biomass is stripped from the plastic media by the turbulence and floated by the microbubbles. The extra biomass may then be captured and removed in the downstream secondary DAF unit 108.

In some cases, the bio-media in the reactors 112-118 may be made of high density polyethylene (HDPE) in a cylindrical shape. The specific gravity of bio-media is approximately one, so that the bio-media can be easily moved within the reactors 112-118 with biofilms attached. In some cases, the specific gravity of the bio-media may be between 0.97 and 1.01. The dry weight of the bio-media is about 102 to 107 kilograms per cubic meter to assure a strong media structure and that the media are not broken during aeration. The specific surface area of the bio-media is larger than approximately 500 $m^2/m^3$ to provide more surface area for bacteria and microorganism growth and multiplication.

Partition walls are used to divide the bio-media treatment unit 106 into the series (e.g., four) of different functional zones 112-118. Each functional zone 112-118 may be configured to propagate and accumulate specific bacteria and microorganisms based upon the food source, nutrient level, air supply, and environmental conditions. Screen cages may be installed at the exit of each reactor zone 112-118 to retain the bio-media and associated bacteria, and microorganisms in their comfortable and respective zones 112-118. Thus, the bio-media, bacteria, and microorganisms within each of the zones 112-118 are maintained in an environment that is configured to maximize biomass production rates.

In some cases, the bio-media treatment unit 106 uses variable frequency drives (VFD) for automated speed control of blowers based on dissolved oxygen (DO) levels that are continuously monitored by a DO sensor installed in the aerobic reactors 114-118. The ability to automatically speed up, slow down or even turn off the blowers based on real-time DO measurements provides greater control over the process, allowing the bio-DAF system 100 to conserve energy, reduce operating expenses, and improve performance. For example, since most of microorganisms required for BOD and nutrient removals grow and reproduce on the surface of bio-media and are retained in the specific functional zones 112-118, daily operation becomes much easier for an operator, as the system 100 eliminates concerns related to losing bacteria that might otherwise cause system failure.

In the illustrated example, the anoxic bio-media reactor zone 112 is in fluid communication with the primary DAF unit 104 by an effluent pipe, as discussed above. A standard screen cage may cover the effluent pipe exit to stop bio-media from exiting the zone 112. In some cases, the bio-media is filled in the anoxic bio-media reactor zone 112 at a pre-designated filling ratio.

In some implementations, in order to complete a denitrification process for nitrogen removal, the third stage aerobic bio-media reactor effluent 136 is returned into the anoxic bio-media reactor zone 112 by an internal recycle pump 124 at a controlled internal recycle ratio. The internal recycle flow is distributed in anoxic bio-media reactor zone 112 through a diffuser assembly. A wide range of bacteria can grow up on the surface of bio-media in the anoxic bio-media reactor 112. A complicated microorganism system, including different species of bacteria and microorganisms, may be developed in the anoxic bio-media reactor 112 to accomplish the denitrification process. The diversity of the microorganism system makes the anoxic bio-media reactor 112 more stable and able to withstand raw wastewater shocking loadings. For example, the enrichment and accumulation of *Pseudomonas* species in the anoxic bio-media reactor 112 can enhance the denitrification efficiency. In the anoxic bio-media reactor zone 112, there is no aeration, however, for industrial wastewater treatment applications, where TN removal is not the major concern, the anoxic bio-media reactor zone 112 can be easily converted into an aerobic bio-media reactor by adding aeration.

In some implementations, the bio-media reactor zones 114-118 may be in fluid communication with the anoxic bio-media reactor zone 112, such that effluent 138 from the anoxic bio-media reactor zone 112 is received by the first stage bio-media reactor zone 114. In general, the bio-media reactors zones 114-118 may be used to remove BOD and TN. Each functional zone 114-118 may be configured to develop and accumulate the bacteria species and microorganisms based on BOD and nutrient levels in the incoming wastewater. This feature can maximize the BOD and TN removal efficiency to produce better quality treated effluent and to save operating costs. Since the required microorganisms for BOD and TN removals are retained in the bio-media reactors 114-118, the risks associated with potential biomass loss that might cause plant operation failure are reduced. Thus, the system 100, discussed herein, has reduced operation costs, is easier to maintain, and more stable than conventional systems. The treated effluent 136 exiting the third stage bio-media reactor zone 118 meets secondary discharge limits for BOD, TSS, TN, and TP in domestic and municipal wastewater treatment and downstream city sewer or POTW BOD and TSS limits for industrial users.

In particular, anoxic bio-media reactor effluent 138 enters the first stage aerobic bio-media reactor zone 114 through a screen cage, as discussed above. Air and/or oxygen is provided to the first stage aerobic bio-media reactor zone 114 by an aeration system including the blower system 122 and is distributed through a diffuser assembly (e.g., a coarse bubble diffuser). Bio-media in the first stage aerobic bio-media reactor zone 114 may be loaded in at a first pre-designated filling ratio. Since the influent organic loading is high in the effluent 138, fast-growing bacteria species may be selected to dominate in the first stage aerobic bio-media reactor zone 114. Thus, the organic matter and BOD can be oxidized and biodegraded into carbon dioxide and water through metabolism of the microorganism system. The aeration system provides air and/or oxygen for microorganism growth as well as causes water flow for moving and rotating the bio-media within the reactor to avoid biofilm soaring on the surface of the bio-media.

First stage aerobic bio-media reactor effluent 140 enters the second stage aerobic bio-media reactor zone 116, for instance, through a screen cage. The incoming organic loading of the effluent 140 may be significantly reduced, as the effluent 140 has been processed by the anoxic bio-media reactor zone 112 and the first stage aerobic bio-media reactor zone 114. Again, a microorganism system suitable for the available organic matter level is developed within the second stage aerobic bio-media reactor zone 116 and dominating bacteria species may be built up. Again, air and/or oxygen is provided by the blower system 122 and distributed in the second stage aerobic bio-media reactor zone 114 through a diffuser assembly. In the second stage aerobic bio-media reactor zone 116, bio-media may be loaded at a second pre-designated filling ratio. In some cases, the second pre-designated filling ratio may be the same as the first pre-designated filling ratio and, in other cases, the second pre-designated filling ratio may differ from the first pre-designated filling ratio. In the second stage aerobic bio-media reactor zone 116, the organic matter and BOD can be further biodegraded and oxidized into carbon dioxide and water through metabolism of microorganisms. Again, the aeration system provides air and/or oxygen to cause water flow to move and rotate the bio-media within the reactor and to, thus, avoid excessive biofilm forming on the surface of bio-media.

Second stage aerobic bio-media reactor effluent 142 enters the third stage aerobic bio-media reactor zone 118 through a screen cage. Through biodegradation in the first and second stage aerobic bio-media reactors zones 114 and 116, the majority of BOD has been consumed and removed. In general, aerobic autotrophic bacteria species may become the dominating species in the third stage aerobic bio-media reactor zone 118. For example, ammonia may be oxidized to nitrite by Nitroso-bacteria and further to nitrate by Nitro-bacteria.

Again, air and/or oxygen is provided by the blower system 122 and is distributed in the third stage aerobic bio-media reactor 118 through a diffuser assembly. Bio-media may be loaded in the third stage aerobic bio-media reactor zone 118 based on a third pre-designated filling ratio. The third pre-designated filling ratio may be the same as or differ from the first pre-designated filling ratio and the second pre-designated filling ratio. In some cases, part of the effluent 136 from the third stage aerobic bio-media reactor zone 118 is recycled by the internal recycle pump 124 to the anoxic bio-media reactor zone 112, as disclosed above. The remaining effluent 136 enters the secondary DAF unit 108 through a standard screen cage and pipe to further separate biomass and TSS from effluent 136.

Figure 2:
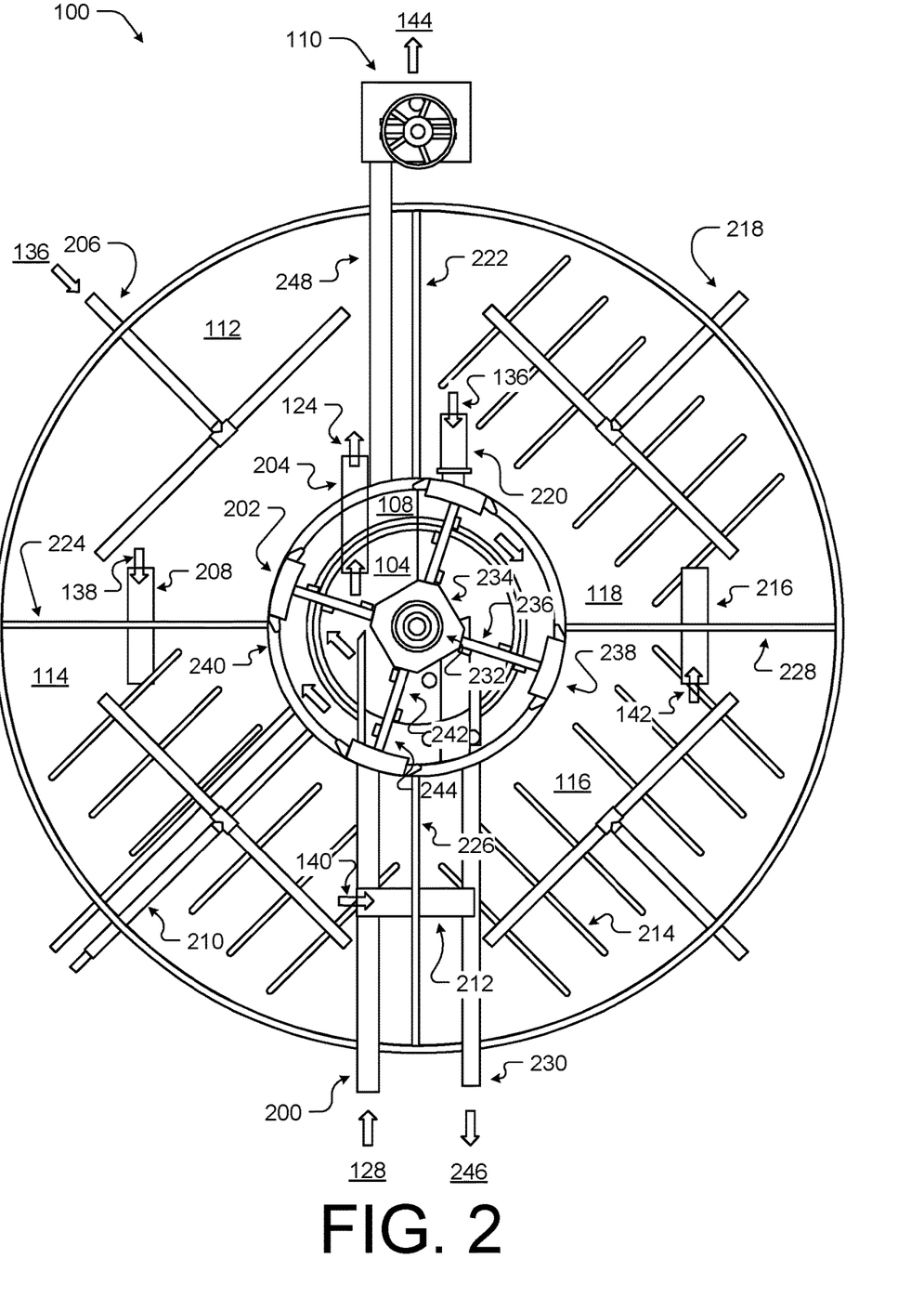
FIG. 2 illustrates a top view of the example bio-dissolved air flotation system of FIG. 1 according to some implementations.

In the illustrated example, the secondary DAF unit 108 is used to remove suspended solids, stripped biofilm, TP and small particulates from the bio-media reactor effluent 136. In particular, the secondary DAF unit 104 extends radially outward around the primary DAF unit 104, as illustrated in FIG. 2. Biomass and TSS in the third stage aerobic bio-media reactor zone effluent 136 may be floated by dissolved gasses (such as, air and/or ozone) introduced into the secondary DAF unit 108. For example, gases may be dissolved in recycled effluent 144 by the secondary gaseous material dissolving system 126. The effluent containing the dissolved gases may be injected through several diffuser pipes above the bottom of the secondary DAF unit 108. Upon exposure to the atmosphere within the secondary DAF unit 108, the dissolved gases form microbubbles that may attach and float the remaining biomass and TSS.

In some cases, the secondary gaseous material dissolving system 126 is used to provide dissolved gases (such as air and/or ozone) for the secondary DAF unit 108 and includes at least one microbubble generator and, in some implementations, an ozone generator with associated valves and controls. The suction line of the microbubble generators is connected to the fill chamber of the effluent weir tank 110. The gases (such as air and/or ozone) are injected on the suction line of the microbubble generators and are dissolved into water under high pressure. Once they are released to atmospheric pressure in the flotation zones of the secondary DAF unit 108, numerous microbubbles are created. In some implementations, ozone may be used to disinfect the secondary stage bio-media reactor effluent and eliminate odor in secondary DAF unit 108. In some cases, the primary gaseous material dissolving system 126 may be an air and ozone dissolving system used to dissolve air and/or ozone.

FIG. 2 illustrates a top view of the example bio-DAF system 100 according to some implementations. As discussed above, the bio-DAF system 100 may be used to remove organic matter, suspended solids, and nutrient removal issues from domestic and municipal wastewater as well as for processing industrial wastewater. The bio-DAF system 100 includes a central column (not shown), a primary DAF unit 104, anoxic bio-media bioreactor zone 112, multiple-stage aerobic bio-media reactors including aerobic bio-media reactor zones 114-118, and a secondary DAF unit 108. The bio-DAF system 100 may also include ancillary equipment, such as a gaseous material dissolving system (e.g., an air and/or ozone dissolving system) and blowers, as discussed above with respect to FIG. 1.

In general, the raw wastewater 128 is received via an inlet pipe 200 at the central column and mixed with recycled effluent having dissolved gases (such as ozone and/or air). The mixture of raw wastewater and recycled effluent and dissolved gases move into the primary DAF unit 104 from the central column. Upon exposure to the atmosphere within the primary DAF unit 104, the dissolved gasses form microbubbles which attach to and float suspended solids, FOG, and BOD particulates in the wastewater. In some cases, additional dissolved gases may be introduced in the primary DAF unit 104. The floated solids, FOG, and BOD particulates may then be removed by a scum collection assembly 202.

The primary DAF unit 104 may be in fluid communication with the bio-media treatment unit 106. For instance, an effluent pipe 204 coupled to the primary DAF unit 104 and the anoxic bio-media reactor zone 112 of the bio-media treatment unit 106 allows for transfer of the primary DAF unit effluent 124 into the bio-media treatment unit 112. A screen cage may cover the effluent pipe 202 exit to stop bio-media from exiting the bio-media reactor zone 112 back into the primary DAF unit 104. The anoxic bio-media treatment unit 112 is used to biodegrade and remove organic matter and nutrients.

In some implementations, in order to complete a denitrification process for nitrogen removal, the third stage aerobic bio-media reactor effluent 136 is returned into the anoxic bio-media reactor zone 112 by an internal recycle pump at a controlled internal recycle ratio. The internal recycle flow is distributed in anoxic bio-media reactor zone 112 through a diffuser assembly 206. A wide range of bacteria can grow up on the surface of bio-media in the anoxic bio-media reactor 112. A complex microorganism system, including different species of bacteria and microorganisms, may be developed in the anoxic bio-media reactor 112 to accomplish the denitrification process. The diversity of the microorganism system makes the anoxic bio-media reactor 112 more stable and able to withstand raw wastewater shocking loadings. For example, the enrichment and accumulation of *Pseudomonas* species in the anoxic bio-media reactor 112 can enhance the denitrification efficiency. In the anoxic bio-media reactor zone 112, there is no aeration, however, for industrial wastewater treatment applications, where TN removal is not the major concern, the anoxic bio-media reactor zone 112 can be easily converted into an aerobic bio-media reactor by adding aeration.

In some implementations, the bio-media reactor zones 114-118 may be in fluid communication with the anoxic bio-media reactor zone 112, such that effluent 138 from the anoxic bio-media reactor zone 112 is received by the first stage bio-media reactor zone 114 via a screen cage 208. Air and/or oxygen is provided to the first stage aerobic bio-media reactor zone 114 the by an aeration system including the blower system and is distributed through a diffuser assembly (e.g., a coarse bubble diffuser) 210. Bio-media in the first stage aerobic bio-media reactor zone 114 may be loaded in at a first pre-designated filling ratio. Since the influent organic loading is high in the effluent 138, fast-growing bacteria species may be selected to dominate in the first stage aerobic bio-media reactor zone 114. Thus, the organic matter and BOD can be oxidized and biodegraded into carbon dioxide and water through metabolism of the microorganism system. The air and/or oxygen provided by the diffuser assembly 210 provides for microorganism growth as well as causes water flow for moving and rotating the bio-media within the reactor to avoid biofilm soaring on the surface of the bio-media.

First stage aerobic bio-media reactor effluent 140 enters the second stage aerobic bio-media reactor zone 116, for instance, through a screen cage 212. The incoming organic loading of the effluent 140 may be significantly reduced, as the effluent 140 has been processed by the anoxic bio-media reactor zone 112 and the first stage aerobic bio-media reactor zone 114. Again, a microorganism system suitable for the available organic matter level is developed within the second stage aerobic bio-media reactor zone 116 and dominating bacteria species may be built up. Again, air and/or oxygen is provided by the blower system and distributed in the second stage aerobic bio-media reactor zone 114 through a diffuser assembly 214, such as a coarse bubble diffuser assembly. In the second stage aerobic bio-media reactor zone 116, bio-media may be loaded at a second pre-designated filling ratio, as discussed above. In the second stage aerobic bio-media reactor zone 116, the organic matter and BOD can be further biodegraded and oxidized into carbon dioxide and water through metabolism of microorganisms. Again, the air and/or oxygen provided via the diffuser 214 acts to cause water flow to move and rotate the bio-media within the reactor and to, thus, avoid biofilm soaring on the surface of bio-media.

Second stage aerobic bio-media reactor effluent 142 enters the third stage aerobic bio-media reactor zone 118 through a screen cage 216. Through biodegradation in the first and second stage aerobic bio-media reactors zones 114 and 116, the majority of BOD has been should be consumed and removed. In general, aerobic autotrophic bacteria species may become the dominating species in the third stage aerobic bio-media reactor zone 118. For example, ammonia may be oxidized to nitrite by Nitroso-bacteria and further to nitrate by Nitro-bacteria. Again, air and/or oxygen is provided by the blower system and is distributed in the third stage aerobic bio-media reactor 118 through a diffuser assembly 218, such as a coarse bubble diffuser assembly.

Bio-media may be loaded in the third stage aerobic bio-media reactor zone 118 based on a third pre-designated filling ratio, as discussed above. In some cases, part of the effluent 136 from the third stage aerobic bio-media reactor zone 118 is recycled by the internal recycle pump 124 to the anoxic bio-media reactor zone 112, as discoed above. The remaining effluent 136 enters the secondary DAF unit 108 through a standard screen cage 220 (and, in some cases, a pipe) to further separate biomass and TSS from effluent 136.

In the illustrated example, the bio-media treatment unit 106 is formed by four flanged sections or zones 112-118. Each functional zone 112-118 may be configured to propagate and accumulate specific bacteria and microorganisms based upon the food source, nutrient level, air supply, and environmental conditions. Screen cages may be installed at the exit of each reactor zone 112-118 to retain the bio-media, bacteria, and microorganisms in their respective zones 112-118. Thus, the bio-media, bacteria, and microorganisms within each of the zones 112-118 are maintained in an environment that is configured to maximize biomass production rates.

Partition walls, such as partition walls 222-228, may be used to divide the bio-media treatment unit 106 into the four different functional zones 112-118. In some situations, to address potential shipping problems due to size, the zones 112-118 may be fabricated as individual flanged sections that may be more easily transported in pieces and assembled at a construction or operational site. Thus, systems 100 of any desired diameter maybe fabricated, shipped to a location, and assembled on site to meet the requirements of the project at hand while still reducing overall transportation costs when compared with conventional systems.

In the illustrated example, the secondary DAF unit 108 is used to remove any combination of suspended solids, stripped biofilm, TP and small particulates from the bio-media reactor effluent 136. In cases in which TP removal is necessary, alum and a small amount of flocculant can also be added in the secondary DAF. In particular, the secondary DAF unit 108 extends radially outward around the primary DAF unit 104, as shown. Biomass and TSS in the third stage aerobic bio-media reactor zone effluent 136 may be floated by dissolved gasses (such as, air and/or ozone) introduced into the secondary DAF unit 108. For example, gases may be dissolved in recycled effluent 144 by the secondary gaseous material dissolving system 126. The effluent containing the dissolved gases may be injected through several diffuser pipes above the bottom of the secondary DAF unit 108. Upon exposure to the atmosphere within the secondary DAF unit 108, the dissolved gases form microbubbles that may attach and float the remaining biomass and TSS and raise them to the surface where the remaining biomass and TSS may be removed via the scum collection assembly 202.

In the current example, a scum collection assembly 202 is shown positioned over the primary DAF unit 104 and the secondary DAF unit 108. The scum collection assembly 202 may be configured to skim FOGs and solid particles from the surface of the wastewater and effluent within each of the DAF units 104 and 108 and discharge the FOG and solid particles into the scum collection trough or chute 230. The scum collection assembly 202 may include a drive motor 232 configured to rotate a scum collection assembly 202. The drive motor 232 as well as the assembly 202 may be mounted on a central drive mounting pad 234. In some implementations, the central drive motor 232 may be equipped with a VFD. In some cases, the central drive motor 232 may cause the assembly 202 to continuously rotate in a clockwise direction. In other cases, the central drive motor 232 may cause the assembly 202 to continuously rotate in a counter-clockwise direction.

In the illustrated example, the scum collection assembly 202 also includes four scraper mounting arms 236 coupled to four side wall wheel assemblies 238. The four side wall wheel assemblies 238 may be configured to mount over the secondary DAF unit wall 240, such that the drive motor 232 may cause the assembly 202 to rotate on over the primary and secondary DAF units 104 and 108 as the wheel assemblies 238 rotate about the secondary DAF unit wall 240.

The scum collection assembly 202 includes a primary scum scraper 242 to collect floated scum from the primary DAF unit 104 and secondary scum scrapers 244 to collect floated scum from the secondary DAF unit 108. Scum 246 collection chute 230 collects the scum skimmed by both the primary scum scrapers 242 and secondary scum scrapers 244. The chute 230 discharges the scum 246 using gravity. For example, the central driven scum scrapers 242 and 244 skim and push the scum 246 accumulated on the surface into the scum collection chute 230. In some cases, the solid content in scum 246 is typically about 3-5%. This saves 70-80% sludge disposal costs over the conventional secondary clarifier wasted sludge, which compare at 0.8-1% solid content.

The treated effluent 144 is then provided to the weir tank 110 after exiting the secondary DAF unit 108 via outlet pipe 248. In some cases, the treated effluent 144 may be recycled back into the system 100. For example, the treated effluent 144 may be used to dissolve gases which are then mixed with the effluent in various zones, such as the primary DAF unit 104, the second DAF unit 108.

Figure 3:
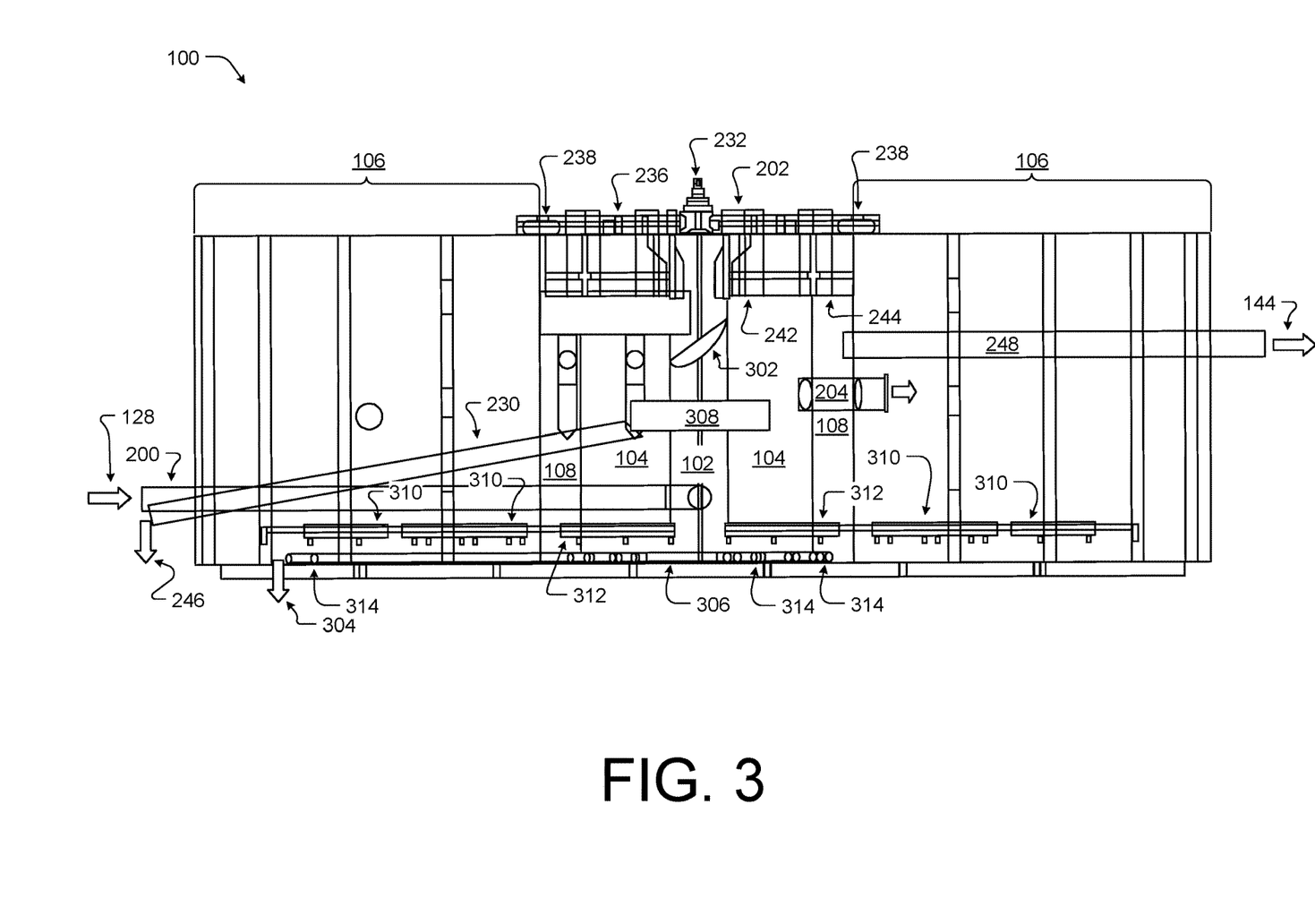
FIG. 3 illustrates a cross-sectional view of the bio-dissolved air flotation system of FIG. 1 according to some implementations.

FIG. 3 illustrates a cross-sectional view of the bio-DAF system 100 of FIG. 1 according to some implementations. The bio-DAF system 100 includes a central column 102, a primary DAF unit 104, a bio-media treatment unit 106, a secondary DAF unit 108, and an effluent weir tank 110. The bio-media treatment unit 106 may be divided into multiple independent zones, such as an anoxic bio-media reactor zone, a first stage aerobic bio-media reactor zone, a second stage aerobic bio-media reactor zone, and a third stage aerobic bio-media reactor zone, as discussed above with respect to FIGS. 1 and 2. The bio-DAF system 100 may also include a primary gaseous material dissolving system and a secondary gaseous material dissolving system.

In some implementations, the central column 102 may be used to introduce and distribute raw wastewater 128 into the bio-DAF system 100 and to provide initial contact between particulate BOD, FOG, and TSS and pressured recirculated effluent. As discussed above, the raw wastewater 128 may be received via an inlet pipe 200 such that the wastewater 128 enters the central column 102 near the bottom. The central column 102 provides FOG and light particulates removal based on the lower uprising velocities of particulates and FOG. Contemporaneously, a mixture of effluent containing dissolved gases (such as air and/or ozone) recycled from the primary DAF unit 104 may be introduced into the central column 102. To prevent FOG accumulation on the surface of the central column 102, an angular guide plate 302 may be mounted within the central column 102. For example, the central column 102 may change the flow direction. In one implementation, the angular guide plate 302 may be mounted on the top of or near the top of the central column 102. In some examples, the central column 102 may be exposed to the atmosphere, via at least openings between a scum collection assembly 202 and a top surface of the central column 102. In an alternative implementation, the central column 102 may be sealed to prevent the formation of the microbubbles in the received raw wastewater 128.

The primary DAF unit 104 may be in fluid communication with the central column 102 via a pipe or screen cage 308, such that effluent exiting the central column 102 enters the primary DAF unit 104. In general, the primary DAF unit 104 may be an annular flotation zone that are used to remove suspended solids, FOG, and BOD particulates in the influent (such as the suspended solids, FOG, and BOD particulates floated by the attached microbubbles). For example, when the effluent (e.g., the mixture of raw wastewater 128 and recycled primary DAF unit effluent containing dissolved gases) is exposed to the atmosphere at the entrance of the primary DAF unit 104, microbubbles form, attach to the suspended solids, FOG, and BOD particulates, and tend to buoy up the attached suspended solids, FOG, and BOD particulates to the surface by lowering their densities. In some cases, the effluent containing the dissolved gases may also be injected through several diffuser pipes, generally indicated by 312, above the bottom of the primary DAF unit 108.

The primary DAF unit 104 may be in fluid communication with the bio-media treatment unit 106. For instance, an effluent pipe 204 coupled to the primary DAF unit 104 and the anoxic bio-media reactor zone of the bio-media treatment unit 106 allows for transfer of the primary DAF unit effluent into the bio-media treatment unit 106.

In some implementations, the bio-media treatment unit 106 is divided into four relatively independent functional zones: the anoxic bio-media reactor zone, and three aerobic bio-media reactors zone (to provide a three-stage aerobic bio-media treatment), as discussed in greater detail above. In general, the bio-media treatment process is based on attached growth biofilm principles to eliminate activated sludge. In some cases, floating plastic media are kept inside the various reactors to provide a place for bacteria and microorganism growth. Aeration is supplied to the aerobic reactors to provide the necessary oxygen for the microbial growth and sufficient mixing to fully disperse the plastic media throughout the reactors. The mixing also serves as a measure to control the biofilm thickness on the plastic media. When the biomass becomes too thick and heavy to hold onto the plastic media, it is sloughed or stripped off from the plastic media. For example, the bio-media treatment unit 106 may include an aeration and turbulence introduction process. The aeration and turbulence within the bio-media treatment unit 106 keeps the biofilm thin and fresh, because extra biomass is stripped from the plastic media by the turbulence and floated by the microbubbles. The extra biomass may then be captured and removed in the downstream secondary DAF unit 108. Air may be provided by a blower system and is distributed in the zones of the bio-media treatment unit 106 through one or more diffuser assemblies 310. The air and/or oxygen provided by the blowers may cause movement of the effluent within the bio-media treatment unit 106.

In the illustrated example, the secondary DAF unit 108 is used to remove suspended solids, stripped biofilm, and small particulates from the bio-media reactor effluent 136. In particular, the secondary DAF unit 108 extends radially outward around the primary DAF unit 104 as shown. Biomass and TSS in the third stage aerobic bio-media reactor zone effluent may be floated by dissolved gasses (such as, air and/or ozone) introduced into the secondary DAF unit 108. For example, gases may be dissolved in recycled effluent by the secondary gaseous material dissolving system. The effluent containing the dissolved gases may be injected through several diffuser pipes, generally indicated by 312, above the bottom of the secondary DAF unit 108. Upon exposure to the atmosphere within the secondary DAF unit 108, the dissolved gases form microbubbles that may attach and float the remaining biomass and TSS. In some cases, the diffusers 312 may be individual or separate diffusers designated to the primary DAF unit 104 and secondary DAF unit 108, as discussed above with respect to FIG. 1. The treated effluent 144 may exit the system 100 from the secondary DAF unit 108 via an exit pipe 248. The treated effluent 144 may exit the secondary DAF unit 144 and enter a weir tank (not shown).

In some cases, the central column 102 may also be configured to trap large solids or heavies to protect the screen cages between each of the zones and the subsequent bio-media reactors. For example, the large solids or heavy sludge 304 may collect on a bottom surface of the central column 102 where the large solids or heavy sludge 304 may be removed and/or collected by a sludge discharge assembly 306. In some cases, the sludge discharge assembly 306 may include one or more discharge ports, generally indicated by 314, to discharge the sludge 304 from the system 100. In some cases, the sludge discharge assembly 306 may run along the bottom of the central column 102, the primary DAF unit 104, the secondary DAF unit 108, and the bio-media treatment unit 106 to remove sludge 304 collecting on the bottom surface of each of the central column 102, the primary DAF unit 104, the secondary DAF unit 108, and the bio-media treatment unit 106.

In the current example, a scum collection assembly 202 is shown positioned over the primary DAF unit 104 and the secondary DAF unit 108. The scum collection assembly 202 may be configured to skim floated FOGs and solid particles from the surface of the effluent within each of the DAF units 104 and 108 and discharge the FOG and solid particles into the scum collection chute 230. The scum collection chute 226 may then push the collected FOG and solid particles 246 out of the system 100.

Figure 4:
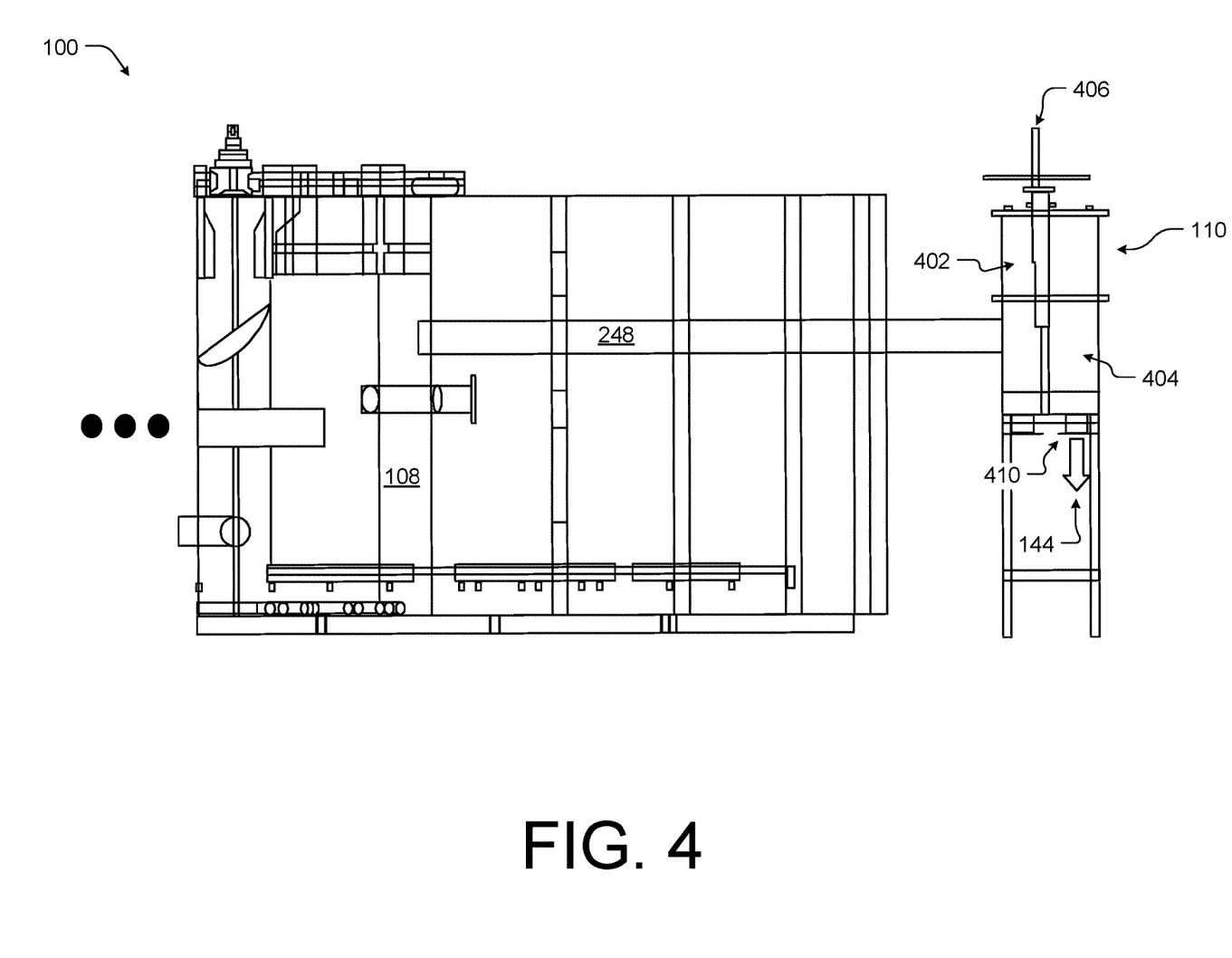
FIG. 4 illustrates a partial view of an example resource recovery system of FIG. 1 according to some implementations.
Figure 5:
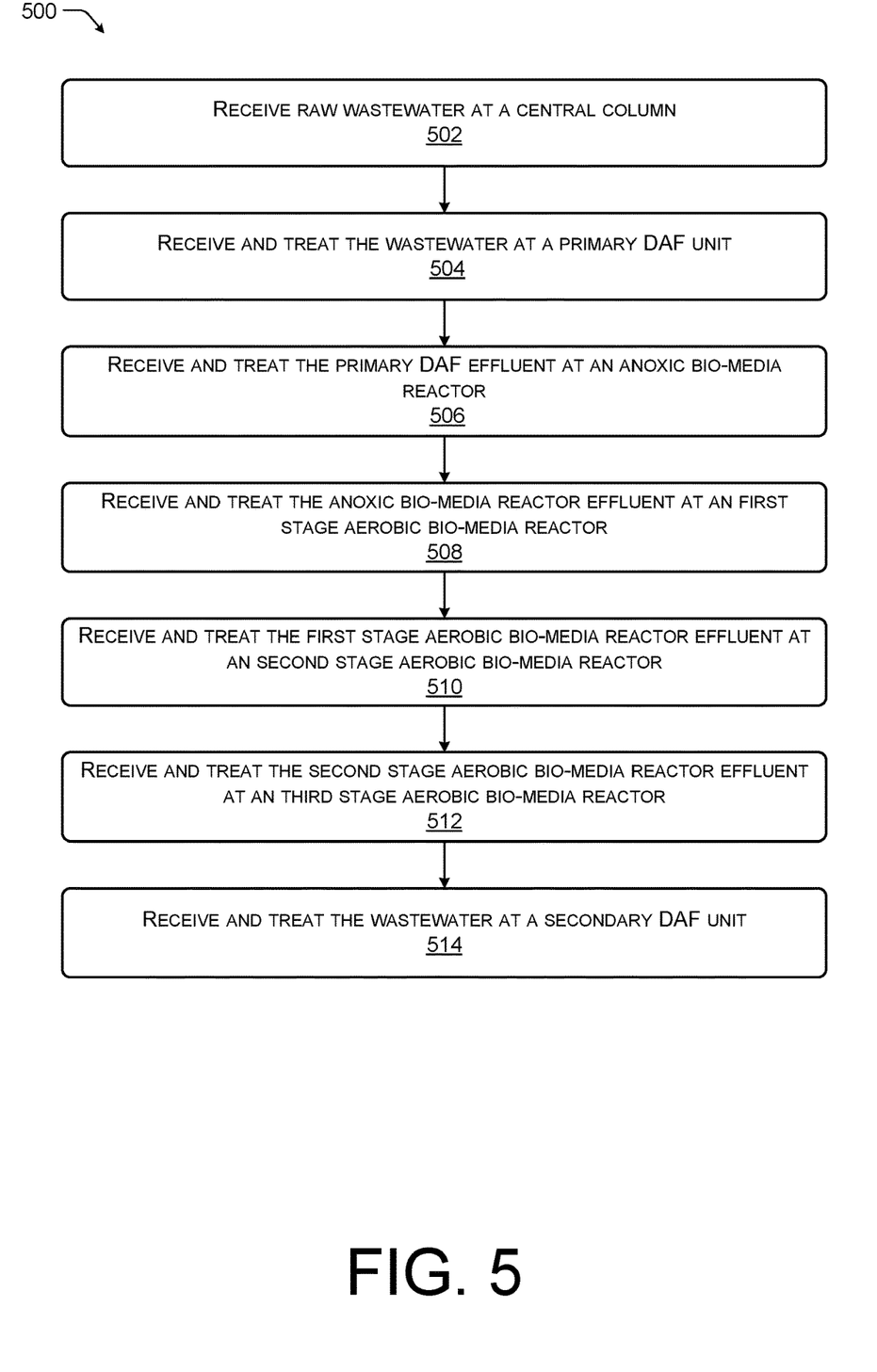
FIG. 5 illustrates an example flow diagram showing a process for treating raw wastewater according to some implementations.

The scum collection assembly 202 may include a drive motor 232 configured to rotate a scum collection assembly 202. In the illustrated example, the scum collection assembly 212 also includes scraper mounting arms, generally indicated by 236, side wall wheel assemblies, generally indicated by 238, and a primary scum scraper 242 and a secondary scum scraper 244 coupled to the scum scraper mounting arms 236. It should be understood that in other implementations, different numbers of scarper mounting arms 236 may be used and various structural beams (not shown) may be associated with the assembly 202, FIG. 4 illustrates a partial view of an example resource recovery system 100 of FIG. 1 according to some implementations. As discussed above with respect to FIG. 3, the treated effluent 144 may exit the system 100 from the secondary DAF unit 108 via an exit pipe 248. The treated effluent 144 may exit the secondary DAF unit 144 and enter a weir tank 110. The effluent weir tank 110 has a filling chamber 402 and outfall chamber 404. In some cases, the gaseous dissolving systems may draw treated effluent 144 from the fill chamber 402. An adjustable weir gate 406 is installed to control the water level in the bio-DAF system 100. When this filling chamber 402 is full, water overflows the adjustable weir gate 406 into the outfall chamber 404. The treated water 144 is discharged through a discharge port 410. FIG. 5 is a flow diagram illustrating example processes associated with the bio-DAF system according to some implementations. The processes are illustrated as a collection of blocks in a logical flow diagram, which represent a sequence of operations. The order in which the operations are described should not be construed as a limitation. Any number of the described blocks can be combined in any order and/or in parallel to implement the process, or alternative processes, and not all of the blocks need be executed.

FIG. 5 illustrates an example flow diagram showing a process 500 for treating raw wastewater according to some implementations. In some cases, the bio-DAF system may include a primary DAF unit, anoxic bio-media bioreactor, multiple-stage aerobic bio-media reactors, and a secondary DAF unit. The bio-DAF system may also include ancillary equipment, such as a gaseous material dissolving system (e.g., an air and/or ozone dissolving system) and blowers that are used in the treating of the raw wastewater. In some situations, such as when the bio-DAF system is used by municipal and domestic wastewater treatment applications for small communities, the secondary DAF effluent (e.g. the treated effluent) can meet the secondary discharge limits for BOD, TSS, ammonia, and TN. In some instances, the treated effluent can be reused for landscaping irrigation and all other reclamation purposes. In other situations, such as in industrial wastewater pretreatment applications, the secondary DAF effluent can meet the downstream city sewer or municipal WWTP discharge requirements for BOD and TSS to be exempt from prohibitive BOD and TSS discharge surcharges.

At 502, the bio-DAF system may receive raw wastewater at a central column via an inlet pipe. The central column may be configured to mix the raw wastewater with recycled effluent containing dissolved gases (such as oxygen and/or ozone). The central column may also be configured to trap large solids or heavies and remove them via a sludge collection assembly at the bottom of the central column.

At 504, the effluent from the central column is received and treated by the primary DAF unit. The primary DAF unit may be configured to introduce additional fluid containing dissolved gases into the effluent. In the primary DAF unit, the dissolved gases are exposed to the atmosphere and form microbubbles. The microbubbles attach to the FOG and particles within the effluent and cause them to buoy up to the surface where the floated FOG and particles may be removed from the system.

At 506, the effluent from the primary DAF unit is received and treated by an anoxic bio-media reactor. Bio-media is filled in the anoxic bio-media reactor at a pre-designated anoxic bio-media filling ratio. In some cases, in order to complete the denitrification process for nitrogen removal, third stage aerobic bio-media reactor effluent may be recycled to the anoxic bio-media reactor by an internal recycle pump at a controlled internal recycle ratio. The internal recycle flow may be distributed in anoxic bio-media reactor through a diffuser assembly. A wide range of bacteria can grow up on the surface of bio-media in the anoxic bio-media reactor. Thus, a complicated microorganism system, including different species of bacteria and microorganisms, may be developed in the anoxic bio-media reactor to accomplish the denitrification process. The diversity of the microorganism system makes the anoxic bio-media reactor more stable and able to withstand the expected raw wastewater shocking loadings. For example, the enrichment and accumulation of *Pseudomonas* species in the anoxic bio-media reactor can enhance the denitrification efficiency. In some cases, there is no aeration in the anoxic bio-media reactor. In other cases, however, such as for industrial wastewater treatment applications, where TN removal is not the major concern, the anoxic bio-media reactor can be converted into an aerobic bio-media reactor by adding air.

At 508, the effluent from the anoxic bio-media reactor is received and treated by a first stage aerobic bio-media reactor. In the anoxic bio-media reactor, air is provided by a blower system and is distributed in the first stage aerobic bio-media reactor through a coarse bubble diffuser assembly. Bio-media is loaded in the first stage aerobic bio-media reactor and may be at a first pre-designated aerobic bio-media filling ratio. Since the influent organic loading is high, fast-growing bacteria species may dominate in the first stage aerobic bio-media reactor. The organic matter and BOD can be oxidized and biodegraded into carbon dioxide and water through metabolism of the microorganism system. The coarse bubble aeration system can provide air for microorganism growth and for moving and rotating the bio-media around the reactor to avoid biofilm soaring on the surface of the bio-media. For example, if the biofilm becomes too thick, it can significantly reduce oxygen transfer efficiency and cause an anaerobic layer inside the biofilm and biofilm sloughing from the bio-media surface.

At 510, the effluent from the first stage aerobic bio-media reactor is received and treated by a second stage aerobic bio-media reactor. For example, the first stage aerobic bio-media reactor effluent may enter the second stage aerobic bio-media reactor through a standard screen cage. The incoming organic loading in the first stage aerobic bio-media reactor effluent may be significantly reduced. A microorganism system suitable for the available organic matter level is developed and the dominating bacteria species are built up in the second stage aerobic bio-media reactor. Air and/or oxygen may be provided by a blower system and the air and/or oxygen may be distributed in the second stage aerobic bio-media reactor through the coarse bubble diffuser assembly. Bio-media is loaded in the second stage aerobic bio-media reactor at a second aerobic pre-designated filling ratio. The organic matter and BOD can be further biodegraded and oxidized into carbon dioxide and water through metabolism of microorganisms.

At 512, the effluent from the second stage aerobic bio-media reactor is received and treated by a third stage aerobic bio-media reactor. For example, the second stage aerobic bio-media reactor effluent may enter the third stage aerobic bio-media reactor through a standard screen cage. Through biodegradation in the first and second stage aerobic bio-media reactors, a majority of BOD may be consumed and removed. In the third stage aerobic bio-media reactor aerobic autotrophic bacteria species may dominate. For instance, ammonia may be oxidized to nitrite by Nitroso-bacteria and further converted to nitrate by Nitro-bacteria. Again, air and/or oxygen may be provided by the blower system and distributed through the coarse bubble diffuser assembly. Bio-media is loaded in the third stage aerobic bio-media reactor at a third aerobic pre-designated filling ratio.

In some cases, part of the effluent from the third stage aerobic bio-media reactor may be recycled by the internal recycle pump to the anoxic bio-media reactor.

At 514, the effluent from the third stage aerobic bio-media reactor is received and treated by a secondary DAF unit. For example, the effluent from the third stage aerobic bio-media reactor may enter the secondary DAF unit through a standard screen cage and pipe. In some cases, the secondary DAF unit is used to remove suspended solids, stripped biofilm, and small particulates from the third stage bio-media reactor effluent. In particular, the biomass and TSS in the third stage aerobic bio-media reactor effluent may be floated within the secondary DAF unit by dissolved air and/or ozone. Once the biomass and TSS is on the surface the biomass and TSS may be removed from the secondary DAF unit.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
    a central column configured to receive wastewater;
    a primary dissolved air flotation (DAF) unit in fluid communication with the central column, such that the central column effluent is received and treated by the primary DAF unit, the primary DAF unit being positioned physically around the central column;
    an anoxic bio-media reactor zone in fluid communication with the primary DAF unit, such that primary DAF unit effluent may be received and treated by the anoxic bio-media reactor zone;
    a first aerobic bio-media reactor zone in fluid communication with the anoxic bio-media reactor zone, such that anoxic bio-media reactor effluent may be received and treated by the first aerobic bio-media reactor zone;
    a second aerobic bio-media reactor zone in fluid communication with the first aerobic bio-media reactor zone, such that first aerobic bio-media reactor effluent may be received and treated by the second aerobic bio-media reactor zone;
    a third aerobic bio-media reactor zone in fluid communication with the second aerobic bio-media reactor zone, such that second aerobic bio-media reactor effluent may be received and treated by the third aerobic bio-media reactor zone; and
    a secondary DAF unit in fluid communication with the third aerobic bio-media reactor zone, such that third aerobic bio-media reactor effluent may be received and treated by the secondary DAF unit, the secondary DAF unit being positioned adjacent to and substantially around the primary DAF unit.

2. The system as recited in claim 1, further comprising: a gaseous material dissolving system in fluid communication with the central column and the primary DAF unit, the gaseous material dissolving system to dissolve gases into a portion of the primary DAF unit effluent; and
    wherein the central column includes at least one diffuser for mixing the portion of the primary DAF unit effluent with the wastewater.

3. The system as recited in claim 1, further comprising:
    a gaseous material dissolving system in fluid communication with the primary DAF unit, the gaseous material dissolving system to dissolve gases into a portion of the primary DAF unit effluent; and
    wherein the primary DAF unit includes at least one diffuser for mixing the portion of the primary DAF unit effluent with the wastewater.

4. The system as recited in claim 1, further comprising:
    a weir tank in fluid communication with the secondary DAF unit for receiving treated effluent from the secondary DAF unit, and for controlling the system fluid level.

5. The system as recited in claim 4, further comprising a gaseous material dissolving system in fluid communication with the weir tank and the secondary DAF unit, the gaseous material dissolving system to dissolve gases into a portion of the treated unit effluent; and
    wherein the secondary DAF unit includes at least one diffuser for mixing the portion of the treated effluent with the third aerobic bio-media reactor effluent.

6. The system as recited in claim 1, further comprising a blower system to provide air to the first aerobic bio-media reactor zone, the second aerobic bio-media reactor zone, and the third aerobic bio-media reactor zone.

7. The system as recited in claim 6, wherein:
    the first aerobic bio-media reactor zone includes at least one first coarse air diffuser coupled to the blower system to distribute the air into the first aerobic bio-media reactor zone;
    the second aerobic bio-media reactor zone includes at least one second coarse air diffuser coupled to the blower system to distribute the air into the second aerobic bio-media reactor zone; and
    the third aerobic bio-media reactor zone includes at least one third coarse air diffuser coupled to the blower system to distribute the air into the third aerobic bio-media reactor zone.

8. The system as recited in claim 1, further comprising a scum collection assembly mounted over the primary DAF unit and the secondary DAF unit, the scum collection assembly including:
    a drive motor for rotating the scum collection assembly;
    a primary scum scraper mounting arm;
    a secondary scum scraper mounting arm;
    a primary scraper mounted to the bottom of the primary scum scraper mounting arm, the primary scraper mounted to push floated particles on a surface of the primary DAF unit into a scum collection chute; and
    a secondary scraper mounted to the bottom of the secondary scum scraper mounting arm, the secondary scraper mounted to push the floated particles on a surface of the secondary DAF unit into the scum collection chute.

9. The system as recited in claim 1, further comprising an internal recycle pump to recycle a portion of the third stage aerobic bio-media reactor effluent into the anoxic bio-media reactor zone.

10. A bio dissolved air flotation system (DAF) system comprising:
    a central column configured to receive wastewater and first fluid having dissolved gases, the wastewater to mix with the fluid in the central column;
    a primary DAF unit to receive central column effluent and a second fluid having dissolved gases, the dissolved gases in the first fluid and the second fluid to form microbubbles within the primary DAF unit;
    the primary DAF unit is formed as a single substantially circular ring and positioned physically adjacent to and around the central column;
    a bio-media treatment unit to receive primary DAF unit effluent and to treat the primary DAF unit effluent using at least one bacteria species; and
    a secondary DAF unit to receive bio-media reactor effluent and a third fluid having dissolved gases, the dissolved gases in the third fluid to form microbubbles within the secondary DAF unit; and
    the secondary DAF unit is formed as a single substantially circular ring and positioned physically adjacent to and around the primary DAF unit.

11. The system as recited in claim 10, further comprising:
    a primary gaseous material dissolving system to dissolve the gases in the first fluid and the second fluid; and
    a secondary gaseous material dissolving system to dissolve the gases in the third fluid.

12. The system as recited in claim 10, wherein the bio-media treatment unit is substantially circular and positioned physically adjacent to and around the secondary DAF unit.

13. The system as recited in claim 12, wherein the bio-media treatment unit is divided into four zones by four partition walls.

14. The system as recited in claim 10, wherein the bio-media treatment unit comprises:
   an anoxic bio-media reactor to receive primary DAF unit effluent, the anoxic bio-media reactor configured to cultivate first bacteria species;
   a first aerobic bio-media reactor to receive anoxic bio-media reactor effluent and air from a blower, the first aerobic bio-media reactor configured to cultivate second bacteria species;
   a second aerobic bio-media reactor to receive first aerobic bio-media reactor effluent and air from the blower, the second aerobic bio-media reactor configured to cultivate third bacteria species; and
   a third aerobic bio-media reactor to receive second aerobic bio-media reactor effluent and air from the blower, the third aerobic bio-media reactor configured to cultivate fourth bacteria species.

15. A bio dissolved air flotation system (DAF) system comprising:
   a substantially circular primary DAF unit to receive wastewater and a first fluid having dissolved gases, the dissolved gases in the first fluid to form microbubbles within the substantially circular primary DAF unit, the microbubbles to cause fats, oils and grease to buoy up to a surface of the substantially circular primary DAF unit;
   a substantially circular bio-media treatment unit in fluid communication with the substantially circular primary DAF unit to receive primary DAF unit effluent, the substantially circular bio-media treatment unit including one or more zones to treat the primary DAF unit effluent using bacteria species; and
   a substantially circular secondary DAF unit in fluid communication with the substantially circular bio-media treatment unit to receive bio-media reactor effluent and a second fluid having dissolved gases, the dissolved gases in the second fluid to form microbubbles within the substantially circular secondary DAF unit to cause remaining biomass to buoy up to a surface of the substantially circular secondary DAF unit, the substantially circular secondary DAF unit positioned between an exterior wall of the substantially circular primary DAF unit and an interior wall of the substantially circular bio-media treatment unit.

16. The system as recited in claim 15, further comprising a central column configured to receive wastewater via an inlet pipe, the central column in fluid communication with the substantially circular primary DAF unit, the circular primary DAF unit being positioned physically around the central column.

17. The system as recited in claim 15, wherein the substantially circular bio-media treatment unit is partitioned into four zones, the zones comprising:
   an anoxic bio-media reactor zone to cultivate first bacteria species;
   a first aerobic bio-media reactor zone to cultivate second bacteria species;
   a second aerobic bio-media reactor zone to cultivate third bacteria species; and
   a third aerobic bio-media reactor zone to cultivate fourth bacteria species.

18. The system as recited in claim 17, wherein each of the four zones are substantially triangular.

19. The system as recited in claim 15, further comprising a scum collection assembly mounted over the substantially circular primary DAF unit and the substantially circular secondary DAF unit, the scum collection assembly including:
   a drive motor for rotating the scum collection assembly;
   a primary scum scraper mounting arm;
   a secondary scum scraper mounting arm;
   a primary scraper mounted to the bottom of the primary scum scraper mounting arm, the primary scraper mounted to push the floated fats, oil, and grease on the surface of the substantially circular primary DAF unit into a scum collection chute; and
   a secondary scraper mounted to the bottom of the secondary scum scraper mounting arm, the secondary scraper mounted to push the floated fats, oil, and grease on the surface of the substantially circular secondary DAF unit into the scum collection chute.

* * * * *